Campbell & Krewson,
Gate Latch.
No. 63,363. Patented Apr. 2, 1867.
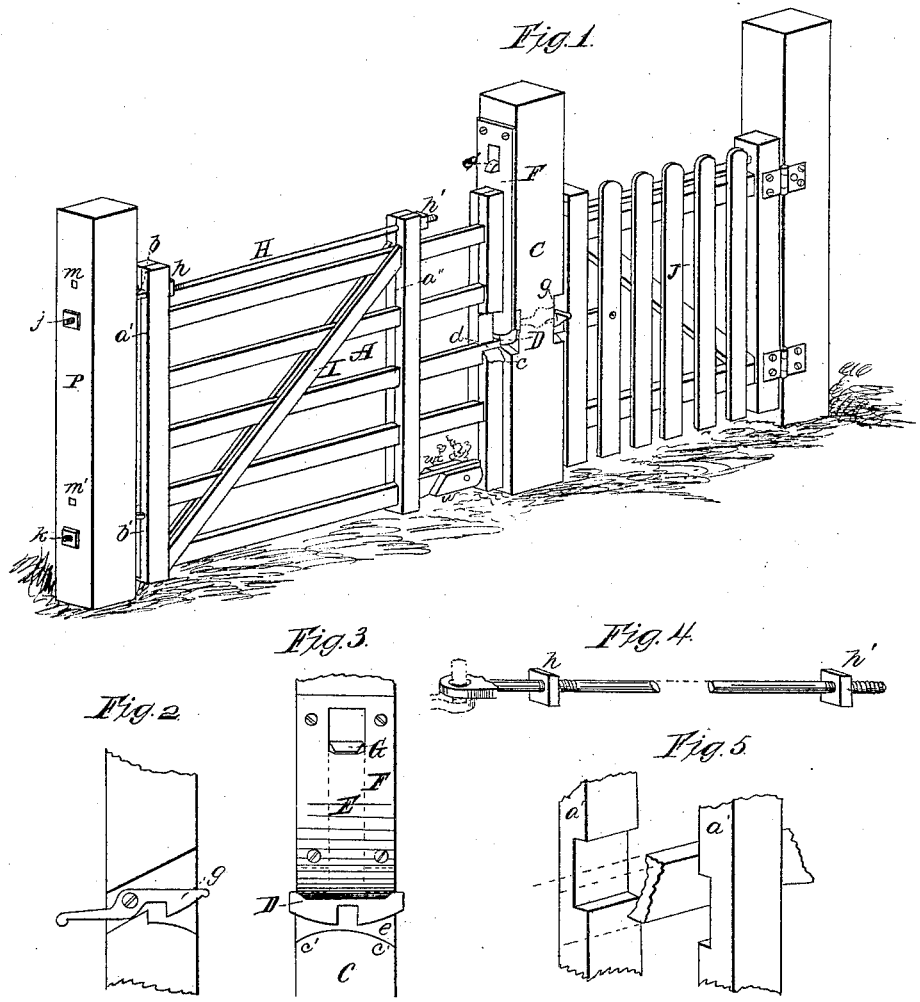
Witnesses:
H. G. Webber
Samuel Knight
Inventors:
James Campbell
Amos D. Krewson
By Knight Bro's
Attorneys.

United States Patent Office.

JAMES CAMPBELL AND AMOS D. KREWSON, OF HARRISON, OHIO.

*Letters Patent No. 63,363, dated April 2, 1867.*

IMPROVEMENT IN FARM GATES.

*The Schedule referred to in these Letters Patent and making part of the same.*

TO WHOM IT MAY CONCERN:

Be it known that we, JAMES CAMPBELL and AMOS D. KREWSON, both of Harrison, Hamilton county, Ohio, have invented a new and useful Gate; and we do hereby declare the following to be a full, clear, and exact description thereof, reference being had to the accompanying drawings, making part of this specification.

Our invention relates to the construction of gates, more particularly those in use upon farms and around stock yards, and consists, first, in a device for latching or holding fast the gate when shut which no animal can open; secondly, in a plan of construction whereby, the gate being equally supported at either end when closed, has no tendency to sag, and in a device whereby any such tendency could be counteracted; and, thirdly, in a more economical method of construction. The annoyance experienced by the proprietors of gardens, lawns, &c., from intelligent cattle and other animals who soon learn to open any common latched or hooked gate is well known, and our invention is intended to do away with such annoyance by furnishing the gate with a fastening which, however expert an animal may become in such entrances, can only be operated by the human hands or some mechanism capable of simultaneous and diverse action at two different points.

Figure 1 represents two gates embodying our invention; one, A, a large farm gate, and one, J, a smaller gate, for the passage of pedestrians.

Figures 2, 3, 4, 5, are details on an enlarged scale.

The gate A is hung to the post B by customary hinges, $b\ b'$, and closes against the post C, which has a gain, $c$, cut on the inside to receive the tongue $a$, which is simply a prolongation of a portion of the centre rail. The lower edges of said gain are bevelled, $c'$, forming a double-inclined plane separated at the centre by a plateau of sufficient width to support the tongue $a$, but without the customary notch or depression into which the tongue drops, and from which it must be lifted in the common gate. In the act of closing the tongue $a$, striking the bevel $c'$, slides up along it to the central plateau. A catch, D, is so suspended on the post as to be lifted by this action of the tongue until, at the moment of reaching the plateau, the tongue engages in a gain in the catch which falls and arrests the farther movement of the tongue. Said catch has a stem, E, enclosed in a box, made by securing a metal or wooden plate, F, against the post, and in which it slides up and down freely, while a hook or lug, G, projecting through a slot in said plate, affords a means of lifting the catch by hand. Fig. 3 is an enlarged view of this latch. The bevel or inclined plane being double, enables the swinging of the gate either way. A modification of this device is shown at J, which represents a small gate intended to open only one way, and the latch $g$ is made to turn upon a pivot and the gain is bevelled only on one side. The tongue or latch is also pivoted in this instance. Fig. 2 shows this catch enlarged. The eye of the upper hinge $b$ of gate A has an elongated shank or rod, H, passing through the hinge post $a'$, and a stay or king-post, $a'\ a'$, near the middle of the gate. This shank being screw-threaded and fitted with nuts, $h\ h'$, enables, by their tightening, the rectification of any sagging that may result from the gate being left open. (See fig. 4.) While closed it is equally supported at either end by the hinges $b\ b'$, and the fixed tongue $a$ resting upon the plateau of gain $c$ in post C. The gates are made of the customary oblong form, consisting of upright posts, $a'\ a''\ a'''$, with horizontal rails, combined with diagonal braces, I I', but we make the uprights of two pieces, in each of which is cut one-half of a gain sufficient to receive the rails, they being afterwards secured by nails, screws, dowels, or similar fastenings. The hooks of the hinges have a shank, $j$, of sufficient length to pass through the post, to which they are attached, which shanks are screw-threaded and secured by a nut. Auxiliary holes, $m\ m,'$ are bored in the post to receive these shanks, above the ones commonly used, to enable the position of the gate to be raised in winter to allow it to swing clear of the snow, the drop-latch D and its plate being correspondingly raised. Near the latch-end of the gate two dogs, $w\ w'$, are pivoted to the bottom rail. These serve as catches to retain the gate in an open position, and, when the gate stands on sloping ground, should be of different lengths to be effective, according as the gate is opened towards the upper or lower side.

We claim herein as new, and of our invention—

1. The fixed tongue or latch $a$, in combination with the elevated plateau on which it rests, approached by the inclined planes on one or both sides, as and for the purpose set forth.

2. The same, in combination with the drop-latch D, boxed into post C, and sliding perpendicularly therein as set forth.

3. The elements of the first claim in combination with the screw-threaded and tapped shank H of the eye of hinge b, forming a brace-rod by which the gate may be strained up should it sag.

4. The provision of the dogs $w\ w'$ for holding the gate in an open position.

In testimony of which invention we hereunto set our hands.

JAMES CAMPBELL,
AMOS D. KREWSON.

Witnesses:
   G. BOWLBY,
   GEO. H. KNIGHT.